US010287045B2

(12) United States Patent
Duncan (10) Patent No.: US 10,287,045 B2
(45) Date of Patent: May 14, 2019

(54) SHRINK SLEEVE APPLICATOR AND RELATED ROLLER CONVEYOR ARRANGEMENT (71) Applicant: Adam W. Duncan, Apex, NC (US)

(72) Inventor: Adam W. Duncan, Apex, NC (US)

(73) Assignee: AXON LLC, Raleigh, NC (US)

( * ) Notice: Subject to any disclaimer, the term of this patent is extended or adjusted under 35 U.S.C. 154(b) by 632 days.

(21) Appl. No.: 14/984,549

(22) Filed: Dec. 30, 2015

(65) Prior Publication Data
US 2017/0190452 A1 Jul. 6, 2017

(51) Int. Cl.
| | |
|---|---|
| *B65B 53/00* | (2006.01) |
| *B65B 53/02* | (2006.01) |
| *B65B 35/22* | (2006.01) |
| *F16C 13/00* | (2006.01) |
| *B21B 39/00* | (2006.01) |

(52) U.S. Cl.
CPC .......... *B65B 53/02* (2013.01); *B21B 39/008* (2013.01); *B65B 35/22* (2013.01); *F16C 13/00* (2013.01)

(58) Field of Classification Search
CPC ......... B65B 53/02; B65B 11/04; B65B 35/22; B21B 39/008; B65G 13/00; B65G 17/24; F16C 13/00
USPC ..................... 53/442; 198/387, 835; 193/37; 492/22-26, 38, 48
See application file for complete search history.

(56) References Cited

U.S. PATENT DOCUMENTS

| | | | | |
|---|---|---|---|---|
| 2,824,638 | A | * | 2/1958 | De Burgh .............. B65G 54/02 198/619 |
| 3,031,038 | A | * | 4/1962 | Chait .................. B60B 33/0094 188/111 |
| 3,597,852 | A | * | 8/1971 | McCollough, Jr. ..... B65B 53/02 198/779 |
| 3,799,834 | A | | 3/1974 | Horvath |
| 3,802,152 | A | | 4/1974 | Strub |
| 3,815,197 | A | * | 6/1974 | Sukenik ................ C03B 35/181 492/42 |
| 3,910,013 | A | | 10/1975 | Babineau |
| 4,143,755 | A | * | 3/1979 | Keller .................... B65G 47/54 198/456 |
| 4,179,863 | A | | 12/1979 | Fresnel |

(Continued)

FOREIGN PATENT DOCUMENTS

EP              709328 A2 *  1/1996

*Primary Examiner* — Alexander M Valvis
*Assistant Examiner* — Katie L Gerth
(74) *Attorney, Agent, or Firm* — Thompson Hine L.L.P.

(57) ABSTRACT

A shrink sleeve apparatus is disclosed herein that includes a shrink sleeve applicator, a downstream heat shrink station, and a horizontal conveyor having side-by-side rollers that have a circumscribing outer portion with at least one high traction segment and at least one low traction segment. A method of applying a shrink sleeve to an article is disclosed that includes providing a conveyor having rollers as disclosed herein, positioning the rollers such that low traction segments of the rollers support the article as it passes a shrink sleeve applicator, which applies a shrink sleeve. The high traction segments of the rollers do not interfere with sleeve application. As the conveyor moves the article and sleeve through a downstream heat shrink zone, the rollers are rotated so that the high traction segments contact the article and sleeve to assure rotation of the article and sleeve during heat shrink.

13 Claims, 9 Drawing Sheets

(56) References Cited

U.S. PATENT DOCUMENTS

| | | | | |
|---|---|---|---|---|
| 4,198,560 A | * | 4/1980 | Dietrich | B65B 53/02 198/774.4 |
| 4,208,857 A | | 6/1980 | Fujio | |
| 4,387,553 A | | 6/1983 | Strub et al. | |
| 4,448,296 A | * | 5/1984 | Tabler | B65G 39/02 193/35 C |
| 4,497,156 A | | 2/1985 | Scheidegger | |
| 4,545,181 A | | 10/1985 | Frankefort | |
| 4,684,011 A | * | 8/1987 | Schneider | B65G 17/24 198/779 |
| 4,765,121 A | | 8/1988 | Konstantin et al. | |
| 4,806,187 A | | 2/1989 | Fujisawa | |
| 4,914,893 A | | 4/1990 | Strub et al. | |
| 5,006,196 A | | 4/1991 | Vandevoorde | |
| 5,024,049 A | | 6/1991 | Strub et al. | |
| 5,060,367 A | | 10/1991 | Vandevoorde | |
| 5,086,682 A | | 2/1992 | Strub et al. | |
| 5,305,578 A | | 4/1994 | Menayan | |
| 5,433,057 A | | 7/1995 | Lerner et al. | |
| 5,483,783 A | | 1/1996 | Lerner et al. | |
| 5,495,704 A | | 3/1996 | Menayan | |
| 5,533,822 A | * | 7/1996 | Tsukada | B41J 13/076 271/109 |
| 5,711,135 A | | 1/1998 | Menayan | |
| 5,715,651 A | | 2/1998 | Thebault | |
| 5,759,337 A | | 6/1998 | Fujio et al. | |
| 6,263,940 B1 | | 7/2001 | Menayan | |
| 6,459,224 B2 | * | 10/2002 | Itoh | B65G 13/075 198/571 |
| 6,474,390 B1 | | 11/2002 | Vandevoorde | |
| 6,523,331 B1 | | 2/2003 | Fresnel | |
| 6,543,514 B2 | | 4/2003 | Menayan | |
| 6,684,599 B1 | | 2/2004 | Fresnel | |
| 6,996,954 B1 | * | 2/2006 | Farley | B65B 9/13 493/273 |
| 8,443,327 B2 | * | 5/2013 | Bin Mohd Razha | G06F 17/5054 716/132 |
| 2003/0111777 A1 | * | 6/2003 | Morando | C23C 2/00 266/120 |
| 2003/0111779 A1 | * | 6/2003 | Morando | C23C 2/00 266/233 |
| 2007/0181402 A1 | * | 8/2007 | Fourney | B65G 47/34 198/370.03 |

\* cited by examiner

SHRINK SLEEVE APPLICATOR AND RELATED ROLLER CONVEYOR ARRANGEMENT

TECHNICAL FIELD

This application relates generally to a shrink sleeve apparatus and, in particular, a horizontal conveyor system for carrying objects during the sleeving and shrinking process.

BACKGROUND

Many products and articles are packaged in shrink sleeve films, which are sealed about the exterior of the article. Machines for installing the shrink sleeve films generally include a sleeve applicator and a heating section that heats the shrink sleeve, causing it to shrink against the article and seal the article within the plastic film of the shrink sleeve. In horizontal sleevers, these machines generally include a conveyor that moves the articles through the sleeve applicator station and the heating section of such a machine as the articles lie horizontally on the conveyor. The conveyor generally includes a plurality of rollers that rotate the article and the applied shrink sleeve in the heating section to assure proper shrink of the entire sleeve.

There is a need for better rollers for conveyors used in shrink sleeve machines.

SUMMARY

According to one aspect of the disclosure, an apparatus is disclosed that includes a shrink sleeve application station, a heat shrink station disposed downstream of the shrink sleeve application station, and a horizontal conveyor having side-by-side first and second rollers. Each of the first and second rollers includes a circumscribing outer portion with at least one high traction segment and at least one low traction segment. The conveyor is positioned so that the first and second rollers travel past the shrink sleeve application station and then past the heat shrink station. As the conveyor passes by the shrink sleeve application station, each of the first and second rollers are maintained in a fixed rotational position in which the at least one low traction segment of each of the first and second rollers is oriented towards a pocket defined between the first and second rollers. As the conveyor passes through the heat shrink station, each of the first and second rollers are rotated so that the at least one high traction segment of each of the first and second rollers rotates into alignment with the pocket defined between each of the first and second rollers.

According to another aspect, a method of applying a shrink sleeve to an article is disclosed that includes utilizing a conveyor including side-by-side first and second rollers. Each of the first and second rollers include a circumscribing outer portion with at least one high traction segment and at least one low traction segment. The method includes conveying an article on the conveyor. The article is supported laterally on the conveyor between the first and second rollers and is in contact with part of the circumscribing portion of each of the first and second rollers. The method includes positioning the first and second rollers such that the article is in contact with the low traction segment of each of the first and second rollers as the article is moved past a shrink sleeve application station and a shrink sleeve is applied to the article, so that the high traction segment of each of the first and second rollers does not interfere with sleeve application. As the conveyor moves the article and applied sleeve through a downstream heat shrink zone, rotating the first and second rollers such that the high traction segment of each roller is brought into contact with the article and applied sleeve to assure rotation of the article and applied sleeve during heat shrink of the applied sleeve. In one aspect, the article is of elongate non-round shape.

According to another aspect, a roller for a horizontal conveyor for a shrink sleeve apparatus is disclosed that includes an outermost surface having a cylindrical shape, and an endless channel extending inward around a circumference of the outermost surface, the endless channel having a high traction segment with a first depth and a low traction segment with a second depth that is greater than the first depth.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Reference is now made in detail to the description of the embodiments as illustrated in the drawings and figures. While several embodiments are described in connection with these drawings, there is no intent to limit the disclosure to the embodiment or embodiments disclosed herein. On the contrary, the intent is to cover all alternatives, modifications, and equivalents.

Figure 1:
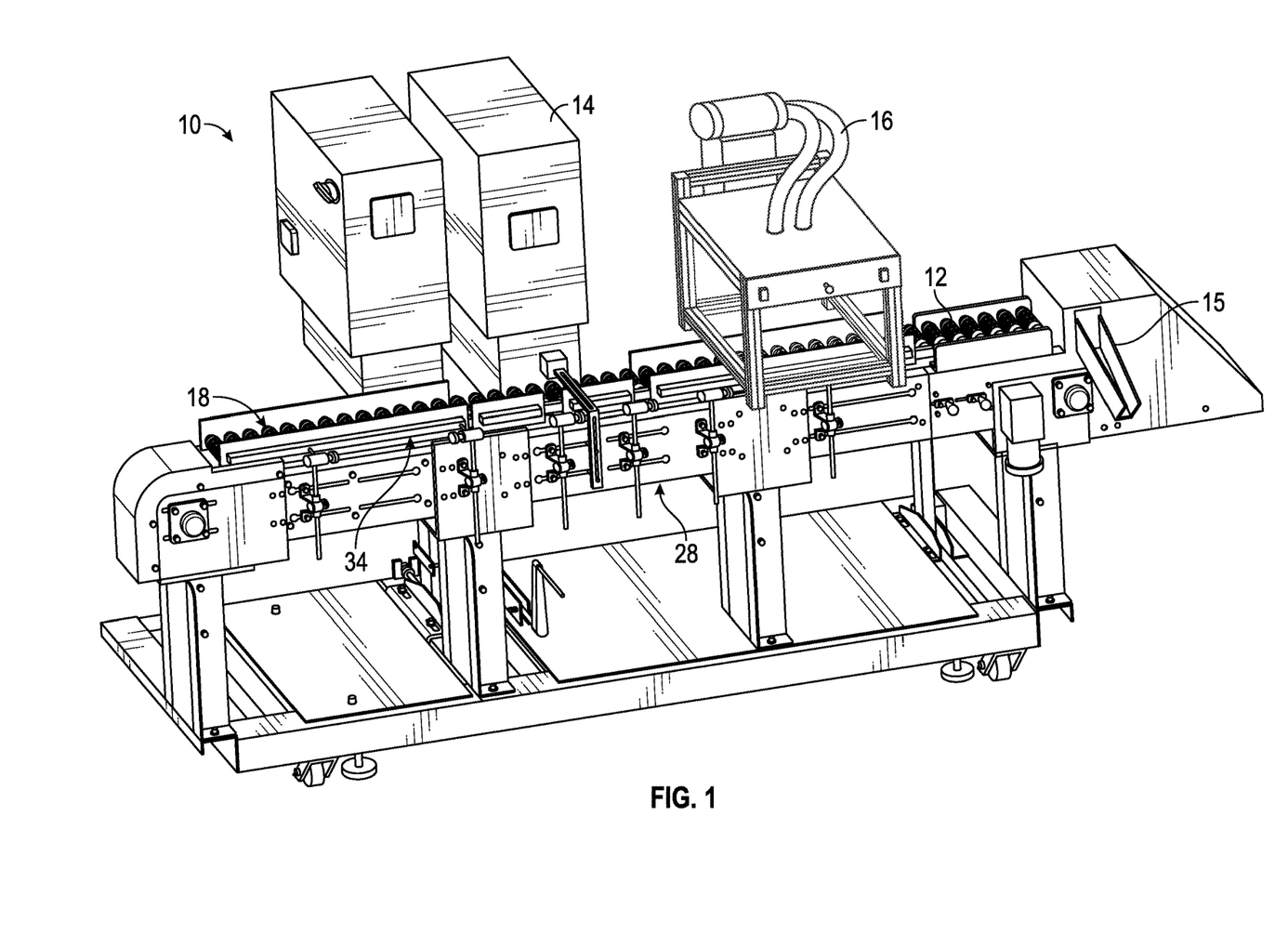
FIG. 1 is a perspective view of a horizontal shrink sleeve apparatus having a conveyor.
Figure 2:
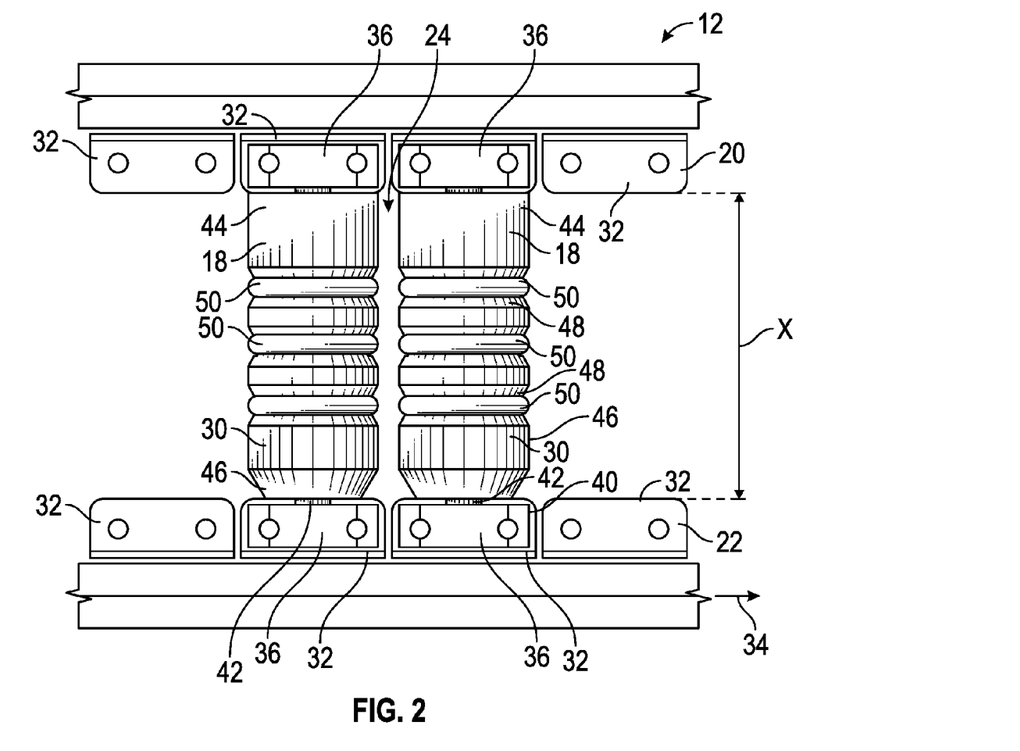
FIG. 2 is a top view of a section of the conveyor in FIG. 1 having rollers as disclosed herein.
Figure 3:
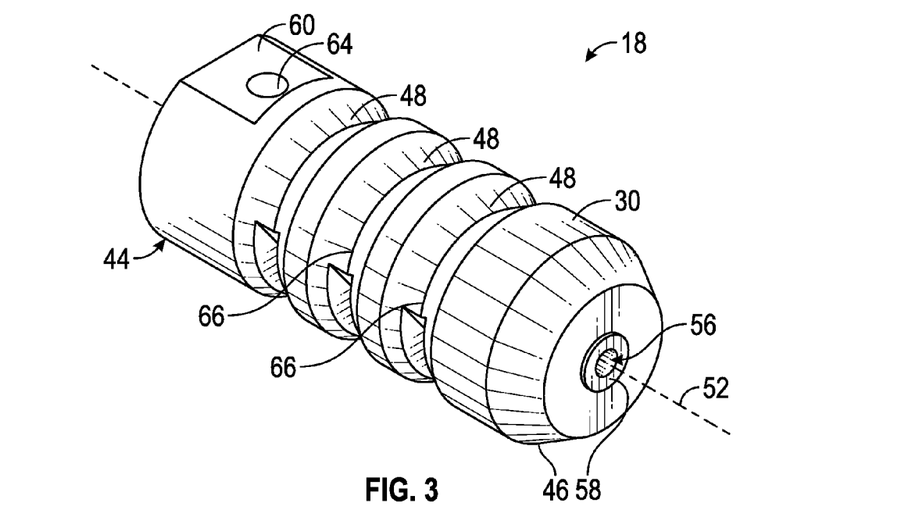
FIG. 3 is a bottom perspective view of the roller in FIG. 2.
Figure 16:
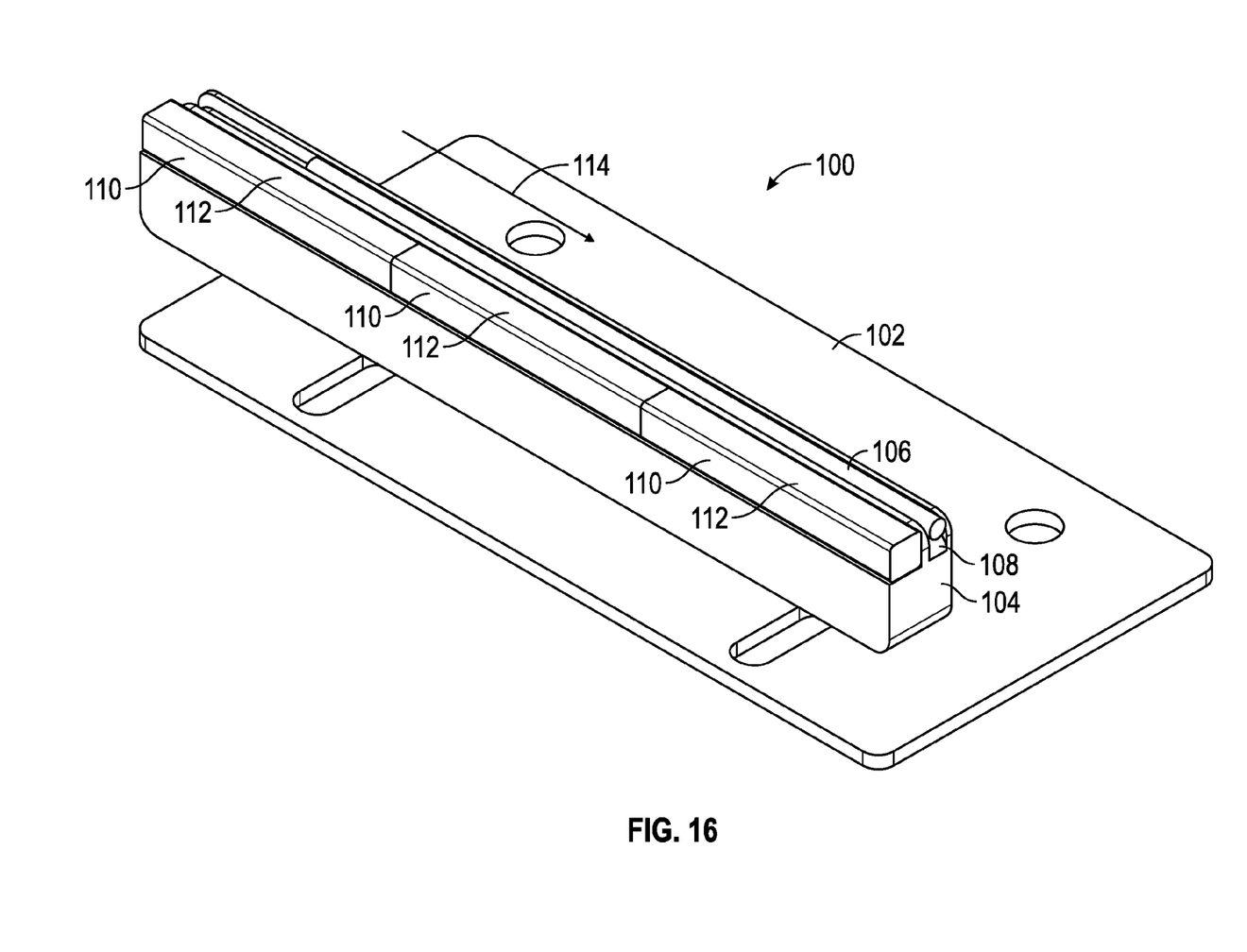
FIG. 16 is a top perspective view of an alignment apparatus of the shrink sleeve apparatus of FIG. 1.

Referring to FIG. 1, a shrink sleeve apparatus 10 generally includes a conveyor 12, an alignment apparatus (also called "alignment station" or "alignment system," best shown in FIG. 16), a shrink sleeve applicator 14, and a heating section 16. The shrink sleeve apparatus 10 is used to seal articles in a shrink sleeve, which is generally a polymeric material formed into a tube or sleeve open at both ends. Referring to FIG. 2, the conveyor 12 generally includes a plurality of rollers 18 mounted between endless chains 20, 22, and articles to be sealed in shrink sleeves are positioned in a v-shaped pocket 24 or valley defined between each pair of adjacent rollers 18 of the conveyor 12 and aligned generally horizontal relative to the ground upon which the conveyor is supported. The alignment apparatus (not shown) is positioned upstream of the shrink sleeve applicator 14 and rotationally aligns each roller 18 in a proper position. Referring back to FIG. 1, the conveyor 12 transports the articles to the shrink sleeve applicator 14, which is configured to push the shrink sleeve horizontally over the article as the article passes by on the conveyor 12. Once the sleeve is positioned on the article, the conveyor 12 conveys the article having the shrink sleeve positioned thereon to the heating section 16. The heating section 16 applies heat to the shrink sleeve to cause the shrink sleeve to shrink over the article and seal the article in the shrink sleeve. Upon exiting the heating section 16, the article is fully encased and sealed within the shrink sleeve.

In the heating section 16, a contacting surface 26 (shown in FIG. 10), such as a belt for example, is positioned in the belly 28 of the conveyor 12 and between the chains 20, 22 (FIG. 2). The contacting surface 26 (FIG. 10) contacts the outermost surface 30 of the rollers 18 at a position generally opposite the v-shaped pocket 24 in which the article bearing the shrink sleeve is received. Contact between the contacting surface 26 and the outermost surface 30 of the rollers 18 along with continued forward movement of conveyor 12 causes the rollers 18 to rotate. Rotation of the rollers 18 causes the shrink sleeve and the article inside the shrink sleeve to rotate. Rotation of the articles and shrink sleeve enables even heating of the shrink sleeve and uniform shrinking of the shrink sleeve about the article. The articles sealed in the shrink sleeves are discharged from the conveyor 12 at a discharge 15 of the shrink sleeve apparatus 10.

Conveyors for horizontal shrink sleeve apparatuses 10 typically include solid straight right circular cylindrical rollers having smooth uniformly cylindrical outermost surfaces. For small lightweight cylindrical articles and irregularly shaped articles, the straight right circular cylindrical rollers fail to properly rotate the articles in the heating section 16, which results in uneven heating of the shrink sleeve and uneven shrinking. This produces an unacceptable shrink wrapped article. The shrink sleeve apparatus 10 disclosed herein includes the horizontal conveyor 12 that has rollers 18 that are capable of rotating small cylindrical articles and irregularly-shaped articles in the heating section 16, while at the same time enabling the shrink sleeve applicator 14 to slide the shrink sleeve over the article without catching on a part of the roller 18.

Referring to FIG. 2, the endless chains 20, 22 of the conveyor 12 are spaced apart by a width X and include a plurality of links 32. The chains 20, 22 are simultaneously driven at the same speed along a continuous, endless path 34 through the shrink sleeve apparatus 10 (FIG. 1). A mount block 36 can be removably coupled to each link 32 of the endless chains 20, 22. Each mount block 36 on chain 20 is aligned with an opposing mount block 36 on chain 22. The mount blocks 36 can have a bore (not shown) in an inner facing side 40 of the mount block 36 for receiving a pin 42 protruding from a roller 18. The conveyor 12 includes the plurality of rollers 18 positioned longitudinally between each opposing set of mount blocks 36. The ends 44, 46 of the rollers 18 are rotationally coupled to opposing mount blocks 36 so that each roller 18 is free to rotate relative to the mount blocks 36 when not engaged with the alignment apparatus.

Figure 4:
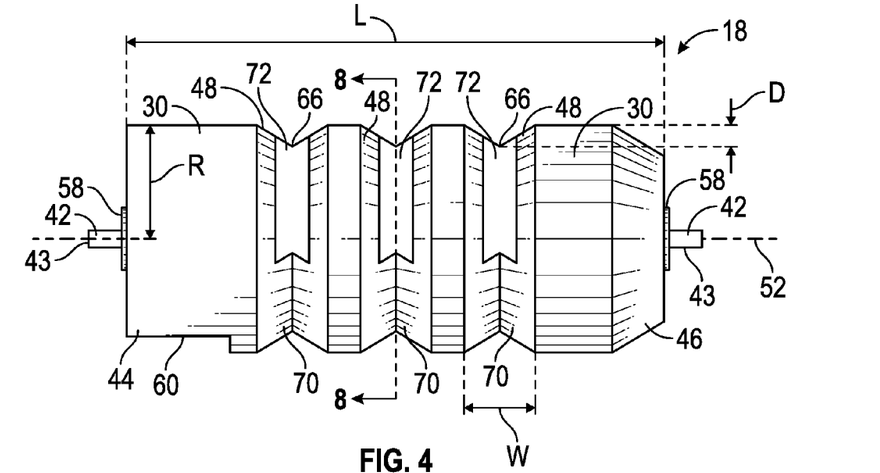
FIG. 4 is a side view of the roller of FIG. 3.

Each of the plurality of rollers 18 is generally cylindrical and has at least one high traction segment 47 and at least one low traction segment 49. Referring to FIGS. 3-9, an outermost surface 30 of each of the plurality of rollers 18 has one or more channels 48 (recesses) formed in the outermost surface 30. As shown in FIG. 2, one or more traction rings 50 are received in the one or more channels 48 in the outermost surface 30. Referring to FIGS. 3-6, the outermost surface 30 is a circumscribing outer portion of the roller 18 and is cylindrical, having a radius R defined from a center axis 52 of the roller 18. Referring to FIG. 6, the roller 18 can include a central bore 54 (FIG. 6) generally concentric about the center axis 52 of the roller 18 and extending longitudinally through the roller 18. The central bore 54 defines an opening 56 through the roller 18 that can receive the pin 42. Referring to FIG. 4, the pin 42 can have a length that is greater than a length L of the roller so that the ends 43 of the pin 42 axially protrude from the ends 44, 46 of the roller 18 and can be received in the mount blocks 36 (FIG. 2) for mounting the roller 18 to the chains 20, 22 of the conveyor 12. When the roller 18 is installed on the conveyor 12, the pin 42 enables the roller 18 to rotate relative to the mount blocks 36. In one embodiment, slide bearings 58 (FIGS. 3-6) can be press fit into the central bore 54 at both ends 44, 46 of the roller 18, and the pin 42 can be received through the slide bearings 58. Slide bearings 58 can facilitate smooth rotation of the roller 18 relative to the mount blocks 36.

Figure 5:
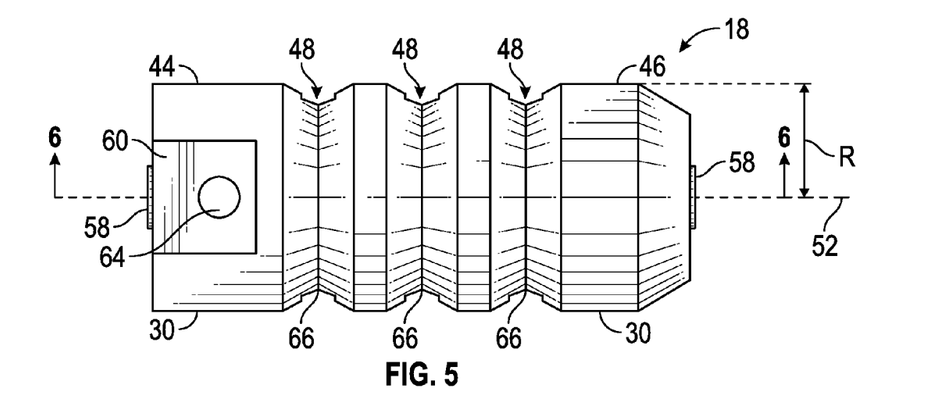
FIG. 5 is a bottom view of the roller of FIG. 3.
Figure 6:
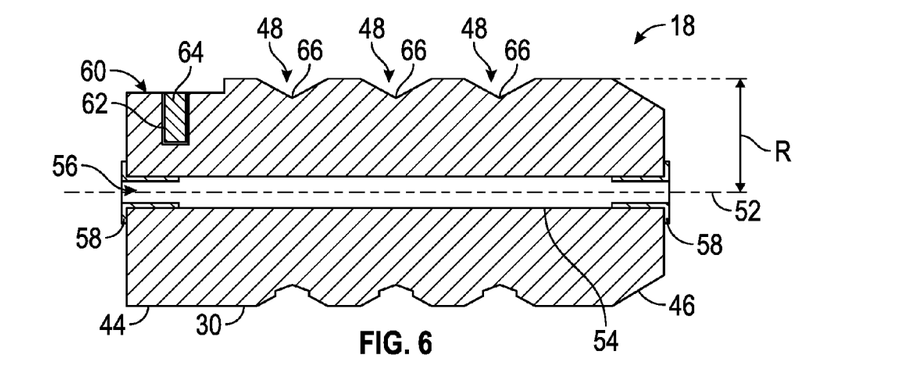
FIG. 6 is a sectional view of the roller of FIG. 3 taken along sectional line 6-6 in FIG. 5.
Figure 7:
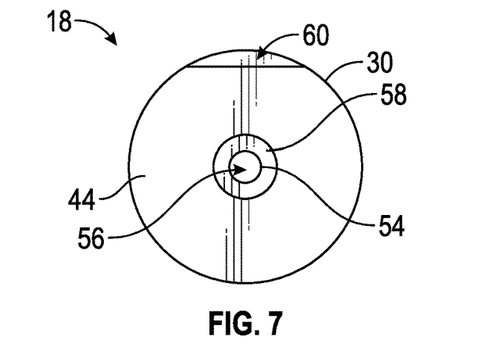
FIG. 7 is a front view of the roller of FIG. 3.

Referring to FIGS. 4-6, at one end 44 of the roller 18, the outermost surface 30 of the roller 18 can have a flat alignment surface 60 cut out of the outermost surface 30. Referring to FIG. 6, the flat alignment surface 60 can have a radial bore 62 extending inward from the flat alignment surface 60 toward the center axis 52 of the roller 18. A pin 64 of magnetic material can be press fit into the radial bore 62. The flat alignment surface 60 and pin 64 can work in conjunction with the alignment apparatus (FIG. 16) to rotationally position the roller 18 in a correct orientation upstream of the shrink sleeve applicator 14 (FIG. 1). The other end 46 of the roller 18 can be straight or beveled.

Figure 17:
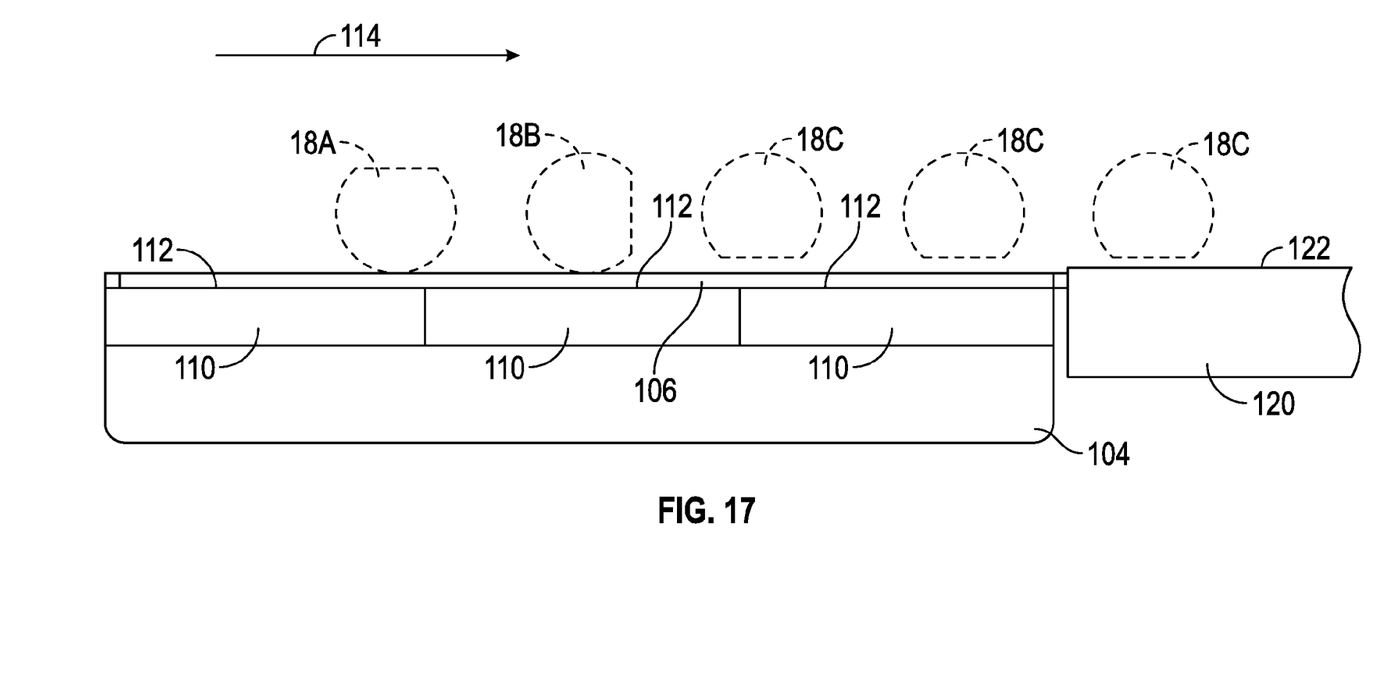
FIG. 17 is a side view schematic of the operation of the alignment apparatus of FIG. 16.

In particular, and referring to the exemplary alignment apparatus of FIG. 16, the alignment apparatus 100 includes mounting plate 102 and block 104 with rubber insert 106 (e.g., positioned in a recessed slot 108) and a series of bar magnets 110 positioned thereon. The assembly 100 is mounted to the conveyor frame with the block 104 positioned below the rollers 18 in alignment with the end portions of the rollers along which the flats 60 and pins 64 are located, and is positioned upstream of the sleeve applicator 14. The rubber insert 106, which may take the form of a cut and straightened o-ring, has an upper surface portion that is slightly higher than the upper faces 112 of the bar magnets 110. As the rollers 18 move over the alignment apparatus 100 (e.g., in travel or conveyance direction 114), the rubber insert 106 contacts the cylindrical portion of the external surface of the rollers 18 causing the rollers to rotate until the flat 60 faces downward toward the alignment apparatus 100, at which point the flat 60 is in a position spaced slightly above the rubber insert 106 so that the roller 18 is no longer in contact with the rubber insert 106 or any other portion of the alignment apparatus 100. The magnetic field produced by the bar magnets 110 then interacts with the insert pins 64 to prevent the rollers 18 from rotating as they continue to move along the length of the alignment apparatus 100. This general operation is reflected in the schematic of FIG. 17 where the rotational stages of the roller and associated flat during movement over the alignment apparatus are represented by 18A, 18B and 18C. Once in rotational position 18C (with flat facing downward and held in place by the magnetic interaction) the roller maintains the 18C position to the end of the alignment apparatus 100. A roller lock apparatus 120 is positioned at the downstream end of the alignment apparatus and includes an upwardly facing surface 122 that is even higher than the rubber insert and that effectively prevents the roller 18 from rotating by close positioning to the roller flat (e.g., if the roller starts to rotate the end edge of the flat on the roller will contact the surface 122 and prevent the rotation). The lock mechanism extends all the way from the end of the alignment apparatus 100 to and slightly beyond the sleeve applicator station to assure the correct roller position desired to enable the sleeve application as described in further detail below. In this sense, alignment apparatus 100 can be considered a preliminary portion of the alignment system and lock apparatus 120 can be considered a secondary portion of the alignment system. Accordingly, as used herein, the term alignment apparatus can generally refer to either apparatus 100 or apparatus 120, or the combination of the two.

Figure 8:
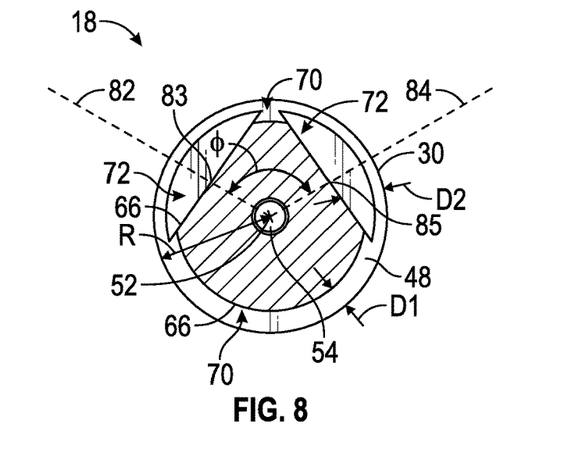
FIG. 8 is a sectional view of the roller of FIG. 3 taken along sectional line 8-8 in FIG. 4.
Figure 9:
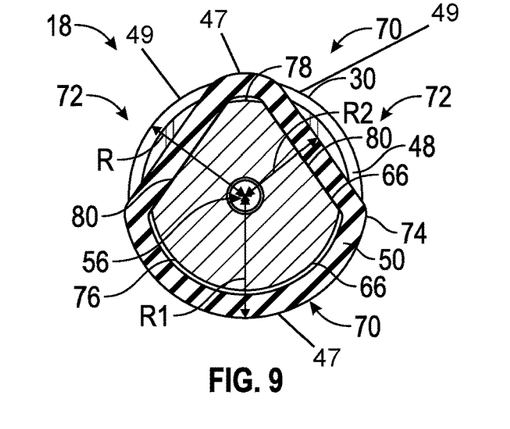
FIG. 9 is a sectional view of the roller of FIG. 3 taken along sectional line 8-8 in FIG. 4, the roller having a traction ring installed in a channel in an outermost surface thereof.
Figure 12:
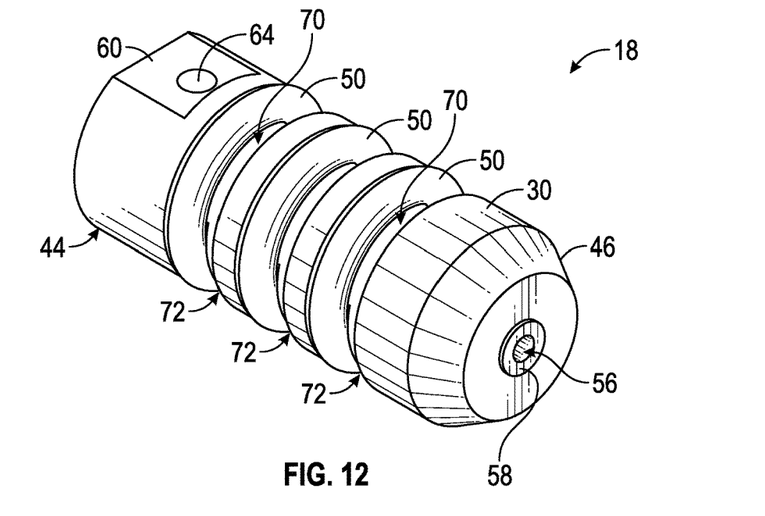
FIG. 12 is a bottom perspective view of the roller of FIG. 3 with the traction rings of FIG. 11 received in the channels.
Figure 13:
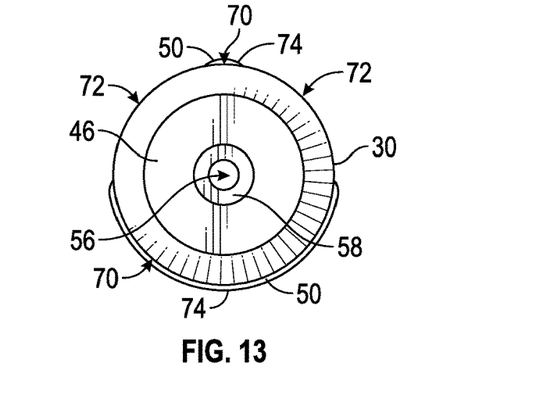
FIG. 13 is a front view of the roller of FIG. 12 having the traction rings received in the channels.

Referring to FIGS. 3-6, the one or more channels 48 in the outermost surface 30 of the roller 18 can be endless circumferential channels extending around the entire circumference of the roller 18. For multiple channel embodiments, the channels 48 can be axially spaced apart along the length L of the roller 18. In one embodiment, the channels 48 are evenly spaced in the axial direction along the length L of the roller 18. Referring to FIG. 4, the channels 48 can be characterized by a depth D that is a radial distance from the bottom surface 66 of the channel 48 to the outermost surface 30 of the roller 18. The depth D of the channel 48 can be irregular. Referring to FIG. 8, the bottom surface 66 of each channel 48 can have an irregular shape when viewed in cross-section. Referring back to FIG. 4, the channels 48 can have an axial width W which can be selected so that the channel 48 is capable of receiving the traction ring 50 (as shown in FIGS. 9, 12, and 13). The width W of the channel 48 is generally greater than an axial thickness of the traction ring 50. In radial cross section, the channel 48 can have any convenient shape, which can include, but is not limited to, V-shaped, rectangular, square, beveled, semi-circular, or other shape. In one embodiment, the channel 48 has a V-shape in radial cross section as shown in FIG. 4. In another embodiment, the channel 48 has a rectangular shape in radial cross section.

Referring to FIGS. 8 and 9, which depict sectional views of the roller 18 taken along sectional line 8-8 in FIG. 4, the sectional line coinciding with the bottom 66 of the channel 48, each channel 48 has at least one traction portion 70 and at least one recessed portion 72. FIG. 8 illustrates the roller 18 without the traction ring 50, and FIG. 9 depicts the roller 18 with the traction ring 50 received in channel 48. The traction portion 70 has a depth D1 that is selected so that an outer surface 74 of the traction ring 50 received in the channel 48 protrudes outward from the channel 48 beyond the outermost surface 30 of the roller 18 in the traction portion 70 of the channel 48 (as shown in FIG. 9). As shown in FIG. 9, the traction portions 70 of the channel 48 correspond to the high traction segments 47 of the roller 18, the high traction segments 47 of the roller 18 being the segments having a higher coefficient of friction from gripping and rotating an article positioned in the v-shaped pocket 24 between rollers 18. In one embodiment, the depth D1 of the traction portion 70 can be less than a radial thickness of the traction ring 50. In one embodiment, the depth D1 can be constant in the traction portion 70 of the channel 48.

The recessed portion 72 of the channel 48 has a depth D2 that is selected so that the traction ring 50 is fully received within the channel 48 and is recessed relative to the outermost surface 30 of the roller 18. As shown in FIG. 9. in the recessed portion 72, the outer surface 74 of the traction ring 50 is recessed relative to the outermost surface 30 of the roller 18 and does not protrude outward beyond the radius R of the outermost surface 30 of the roller 18. The recessed portions 72 of the rollers 18 correspond to the low traction segments 49 of the rollers 18. In the low traction segments 49 of the rollers, the article contacts and is supported by the outermost surface 30 of the roller 18, the outermost surface 30 generally having a coefficient of friction that is less than a coefficient of friction of the high traction segments 47. The depth D2 of the recessed portion 72 can be greater than the depth D1 of the traction section 70 indicating that the traction section 70 is generally shallower than the recessed portion 72 relative to the outermost surface 30 of the roller 18. In one embodiment, the depth D2 in the recessed portion 72 can be variable along the recessed portion 72. In one embodiment, the depth D2 of the recessed portion 72 can be greater than a radial thickness of the traction ring 50.

Referring to FIG. 9, in the traction portion 70 of the channel 48, the outer surface 74 of the traction ring 50 that is received in the channel 48 can have a radial distance R1 from the center axis 52 (best shown in FIG. 3) of the roller 18 that is greater than the radius R of the outermost surface 30 of the roller 18. Thus, the outer surface 74 of the traction ring 50 protrudes outward beyond the outermost surface 30 in the high traction segments 47 of the roller 18. In the recessed portion 72 of the channel 48, the outer surface 74 of the traction ring 50 that is received in the channel 48 can have a radial distance R2 that is less than the radius R of the outermost surface 30 of the roller 18. Thus, in the recessed portions 72 corresponding to the low traction segments 49 of the roller 18, the traction ring 50 is completely received within the channel 48 and does not protrude outward beyond the outermost surface 30 of the roller 18. The article then contacts and is supported by the outermost surface 30 of the roller 28 rather than the outer surface 74 of the traction ring 50.

Referring back to FIG. 8, the channel 48 can have two or more recessed portions 72. The recessed portions 72 of the channel 48, when the channel 48 is viewed in cross-section, are circumferentially spaced apart from each other such that a first radial line 82 passing from the center axis 52 of the roller 18 through a midpoint 83 of one recessed portion 72 forms an angle $\phi$ with a second radial line 84 passing from the center axis 52 of the roller 18 through a midpoint 85 of another recessed portion 72. The angle $\phi$ between the first radial line 82 and the second radial line 84 can be in a range of 80 degrees to 160 degrees in one embodiment, or 100 degrees to 140 degrees in another embodiment, or 110 to 130 in yet another embodiment.

Referring to FIG. 9, in one embodiment, each channel 48 can have two traction portions 70 alternating with two recessed portions 72. In cross section at the axial center of the channel 48, the cross-sectional shape of the roller 18 corresponding to the bottom surface 66 of the channel 48 can include a longer arc 76, a shorter arc 78, and two chords 80, each of the chords 80 extending to connect the ends of the longer arc 76 to the ends of the shorter arc 78. The cross-sectional shape resembles a circle having two segments cut out along two chords 80. The traction portions 70 of the channel 48 correspond to the portions in which the bottom surface 66 of the channel 48 coincides with the long arc 76 and short arc 78 extending along the circumference of the circle. The recessed portions 72 coincide with the chords 80 that extend to connect the ends of the long arc 76 to the ends of the short arc 78 and cut off the segments of the circle.

Figure 10:
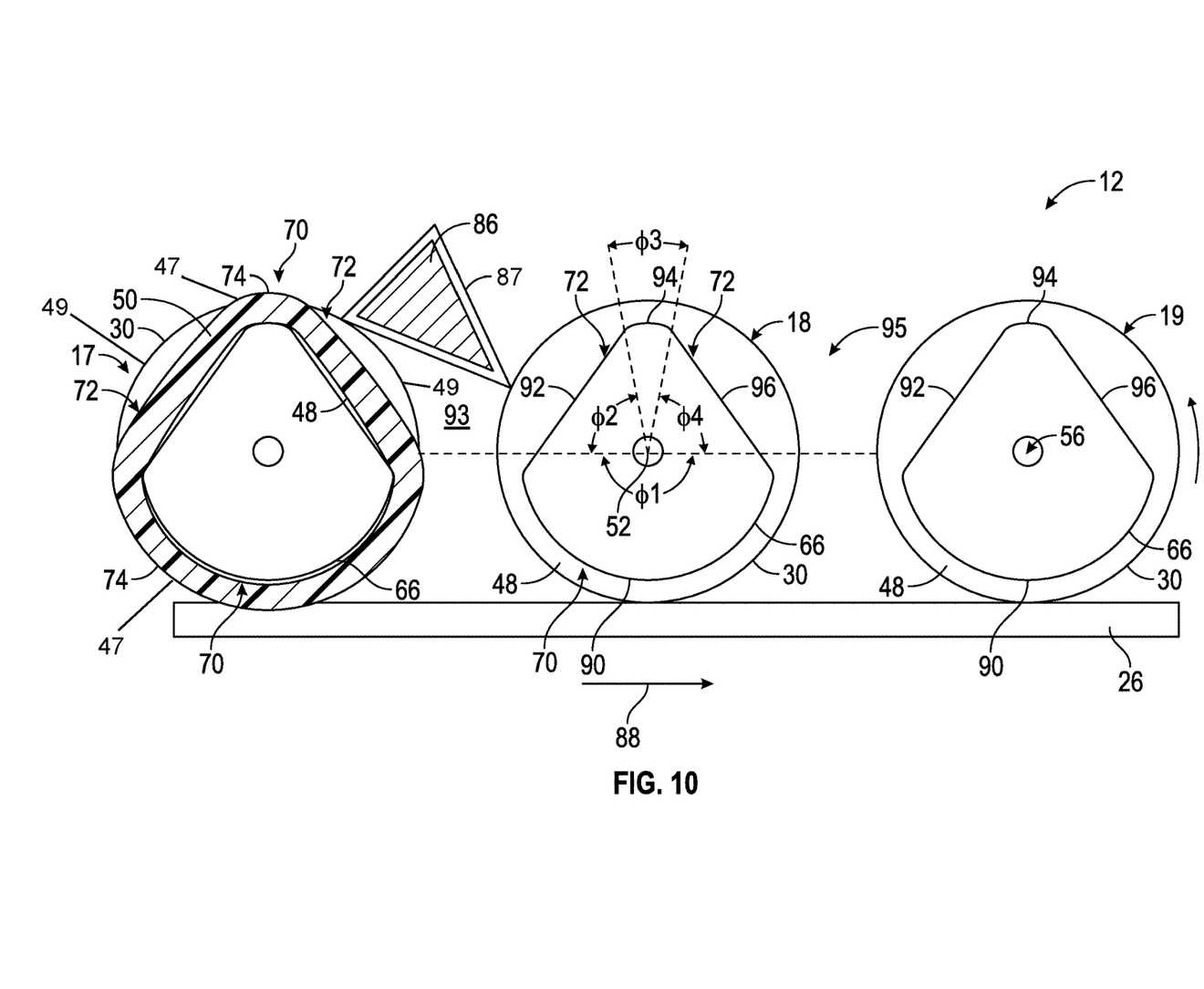
FIG. 10 is a schematic view of the rollers of FIG. 3 in operation in a conveyor of FIG. 2.

FIG. 10 is a schematic depicting operation of the rollers. For purposes of illustration, the rollers 17, 18, 19 are shown in cross-section without cross-hatching, and only one of the rollers 17 is depicted as having a traction ring 50 received in the channel 48. The traction ring 50 is omitted from the other rollers for the purposes of illustration. As shown in FIG. 10, the recessed portions 72 of roller 18 are circumferentially spaced apart and positioned so that, when the roller 18 is rotationally locked in position by the alignment apparatus 100 (FIGS. 16 and 17) upstream of the shrink sleeve applicator 14 (FIG. 1), one recessed portion 72 of each channel 18 of roller 18 faces towards a leading v-shaped pocket 93 defined between the roller 18 and one immediately adjacent roller 17, and the other recessed portion 72 of each channel 48 faces towards a trailing v-shaped pocket 95 defined between the roller 18 and the other immediately adjacent roller 19. With the roller 18 positioned so that the recessed portions 72 face towards the v-shaped pockets 93, 95, the recessed portions 72 of each channel 48 are aligned with and face toward the articles 86 positioned in the v-shaped pockets 93, 95 formed between roller 18 and adjacent rollers 17, 19. For rollers 18 having multiple channels 48 (FIGS. 2-4), the traction portions 70 and recessed portions 72 of each channel 48 are radially aligned with the traction portions 70 and recessed portions 72 of each of the other channels 48. The direction of travel 88 of the conveyor 12 is indicated by the arrow in FIG. 10. As used herein, the term "leading" refers to the portions of the roller 18 facing generally in the direction of travel 88 of the conveyor 12, and the term "trailing" refers to the portions of the roller 18 facing generally away from the direction of travel 88 of the conveyor 12.

In one embodiment, the channel 48 of roller 18 can include a major traction portion 90, a leading recessed portion 92, a minor traction portion 94, and a trailing recessed portion 96. In the rotational position locked by the alignment apparatus 100 (FIG. 16), the major traction portion 90 faces generally towards the belly 28 of the conveyor 12, which is downward relative to the page on which FIG. 10 is drawn. The major traction portion 90 occupies a sector of the cross-section of the roller 18 positioned between the trailing recessed portion 96 and the leading recessed portion 92, the sector being defined by angle φ1, which can be in a range of about 140 degrees to about 180 degrees in one embodiment, or from about 150 degrees to about 170 degrees in another embodiment, or about 160 degrees in yet another embodiment. The leading recessed portion 92 occupies a sector of the cross-section of the roller 18 between the major traction portion 90 and the minor traction portion 94, the sector being defined by φ2, which can be in a range of 70 degrees to 110 degrees in one embodiment, or about 80 degrees to about 100 degrees in another embodiment, or about 90 degrees in yet another embodiment. The leading recessed portion 92 faces generally toward the leading v-shaped pocket 93 defined between roller 18 and leading adjacent roller 17. The minor traction portion 94 occupies a sector of the cross-section of the roller 18 positioned between the leading recessed portion 92 and the trailing recessed portion 96, the sector defined by angle φ3, which can be in a range of about 5 degrees to about 45 degrees in one embodiment, or from about 15 degrees to about 35 degrees in another embodiment, or about 20 degrees in yet another embodiment. When the roller 18 is in the locked position, the minor traction portion 94 faces upward relative to the page on which FIG. 10 is drawn. The trailing recessed portion 96 occupies a sector of the cross-section of the roller 18 between the minor traction portion 94 and the major traction portion 90, the sector being defined by φ4, which can be in a range of 70 degrees to 110 degrees in one embodiment, or about 80 degrees to about 100 degrees in another embodiment, or about 90 degrees in yet another embodiment. The trailing recessed portion 96 faces generally towards the trailing v-shaped pocket 95 defined between the roller 18 and the trailing adjacent roller 19.

Still referring to FIG. 10, the recessed portions 72 of the channel 48 are generally positioned in one hemisphere of the roller 18 so that, when the roller 18 is rotationally positioned and locked by the alignment apparatus 100 (FIG. 16), the recessed portions 72 face generally upwards and outwards toward the v-shaped pockets 93, 95 defined between roller 18 and adjacent rollers 17, 19. Referring back to FIG. 4, the flat alignment surface 60 can be positioned on the outermost surface 30 in a circumferential position diametrically opposed from the recessed portions 72. In other embodiments, the flat alignment surface 60 can be positioned on the same side of the roller 18 as the recessed portions 72.

The rollers 18 are constructed of a rigid material capable of withstanding temperatures experienced in the heating section 16 of the shrink sleeve apparatus 10. The rollers 18 may also be constructed of a material that is durable and exhibits low wear. Materials suitable for the rollers 18 include, but are not limited to, metals such as steel, aluminum, iron, other metal, and alloys of said metals; or thermoplastics, such as high density polyethylene, polypropylene, polyamides, polyvinyl chloride, or other thermoplastics. The rollers 18 may have one or more finishes, treatments, or coatings applied to the outermost radial surface or other surfaces of the roller. In one embodiment, the roller 18 is an anodized aluminum roller.

Figure 11:
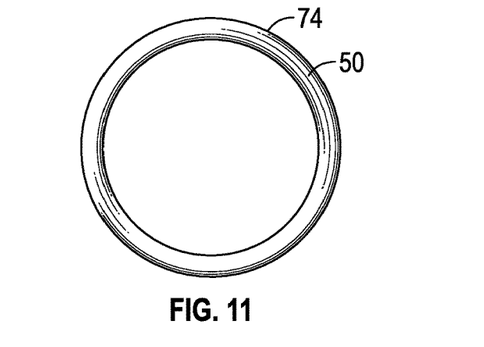
FIG. 11 is a side view of a traction ring for use with the roller of FIG. 3.

Referring to FIG. 11, the traction ring 50 received in each of the channels 48 in the rollers 18 can have a shape that is generally annular or torus and can be made from a compliant material that can conform to the irregular transverse cross-sectional shape of the channels 48 (FIG. 5). The traction ring 50 can have any convenient radial cross-sectional shape, such as circular, square, triangular, rectangular, polygonal or other shape. Referring to FIGS. 12 and 13, the outer surface 74 of the traction rings 50 has a coefficient of friction that is generally greater than a coefficient of friction of the outermost surface 30 of the roller 18. The greater coefficient of friction enables the outer surface 74 of the traction ring 50 to enter into frictional engagement with (e.g., grip) the plastic film of the shrink sleeve so that the roller 18 can rotate the shrink sleeve and article disposed therein in the heating section. The traction rings 50 are made of a material that can withstand the temperatures in the heating section 16 of the shrink film apparatus 10 (FIG. 1). The traction rings 50 are also made of a material that is resilient so that the traction rings 50 can be elastically expanded to fit over the outermost surface 30 of the roller 18 and still return to a smaller dimension once received in the channels 48 in order to conform to the irregular cross-section of the channels 48. Materials suitable for the traction ring 50 can include, but are not limited to, natural rubbers, synthetic rubbers, elastomers, thermoplastics, and combinations thereof, for example.

Referring back to FIGS. 1-3, operation of the roller 18 having the traction rings 50 disposed in the channels 48 will be described. As the conveyor 12 moves in the direction of travel 88, the rollers 18 generally freely rotate relative to the mount blocks 36 to which they are removeably coupled. Before each roller 18 reaches the shrink sleeve applicator 14 (FIG. 1) the roller 18 passes over the alignment apparatus 100 (FIG. 16), which is located in the belly 28 of the conveyor 12 (FIG. 1). The alignment apparatus rotates the rollers 18 into a proper rotational position for installing the shrink sleeves over the article and locks the rollers 18 into the proper rotational position.

Referring to FIG. 10, proper rotational positioning of the roller 18 results in each of the recessed portions 72, including leading recessed portion 92 and trailing recessed portion 96, being oriented to face towards the v-shaped pockets 93, 95 defined between the roller 18 and the immediately adjacent rollers 17, 19. With the rollers 17, 18, and 19 all aligned in this position, the articles 86, prior to applying the shrink sleeves 87, rest against the outermost surfaces 30 of rollers 17 and 18 and are supported through tangential contact with the outermost surfaces 30 of rollers 17 and 18. The outer surfaces 74 of the traction rings 50 are recessed within the recessed portions 72 of the channels 48. Being recessed, the outer surfaces 74 of the traction rings 50 are, thus, not in contact with and do not support the articles 86 disposed in the pockets 24. With the rollers 18 in this position, the shrink sleeve applicator 14 (FIG. 1) can push the shrink sleeve 87 onto the article 86 supported in the v-shaped pockets 93, 95 without the shrink sleeve 87 catching or binding on the outer surface 74 of the traction rings 50, which have a higher coefficient of friction than the outermost surfaces 30 of the rollers 17, 18. The corners at which the outermost surface 30 of the roller 18 meets the channel 48 can be beveled or otherwise shaped to further reduce the shrink sleeve 87 catching and binding on a part of the roller 18 as the shrink sleeve 87 is pushed over the article 86.

Once the shrink sleeves 87 are applied to the articles 86, engagement of the flat alignment surface 60 of the roller 18 can be released from the alignment apparatus, and the roller 18 can then freely rotate relative to the mount blocks 36. When the conveyor 12 conveys the rollers 18 to the heating section 16 (FIG. 1), a contacting surface 26 contacts the outermost surface 30 of the rollers 18 causing the rollers 18 to slowly rotate relative to the mount blocks 36 (FIG. 1). Rotation of the rollers 18 in the heating section 16 causes the traction portions 70 of the channel 48 to rotated towards the article 86 having the shrink sleeve 87 disposed around it. When one of the traction portions 70 of the channels 48 reaches the article 86, the outer surfaces 74 of the traction rings 50, which protrude outward from the channel 48 beyond the outermost surfaces 30 of the rollers 18, come into contact with the shrink sleeve 87 surrounding the article 86. Having a higher coefficient of friction than the outermost surfaces 30 of the rollers 18, the outer surfaces 74 of the traction rings 50 engage the shrink sleeve 87 and cause the shrink sleeve 87 and the article 86 to rotate in place within the v-shaped pockets 93, 95 (ref no. 24 in FIG. 2) between adjacent rollers 17, 18, 19. Just as a traction portion 70 of roller 18 rotates out of contact with the shrink sleeve 87 on the article 86, the traction portion 70 of adjacent roller 19 rotates into contact with the shrink sleeve 87 on the article 86. In this manner, the alternating protruding portions of the outer surface 74 of the traction rings 50 maintain rotation of the shrink sleeve 87 and article 86 throughout the heating section 16 (FIG. 1). The greater coefficient of friction of the outer surfaces 74 of the traction rings 50 enables the roller 18 to grip small, light, or irregularly shaped articles 86 and rotate them in the heating section 16, which ensures that the shrink sleeve 87 is uniformly heated as it shrinks about the article 86.

Figure 14:
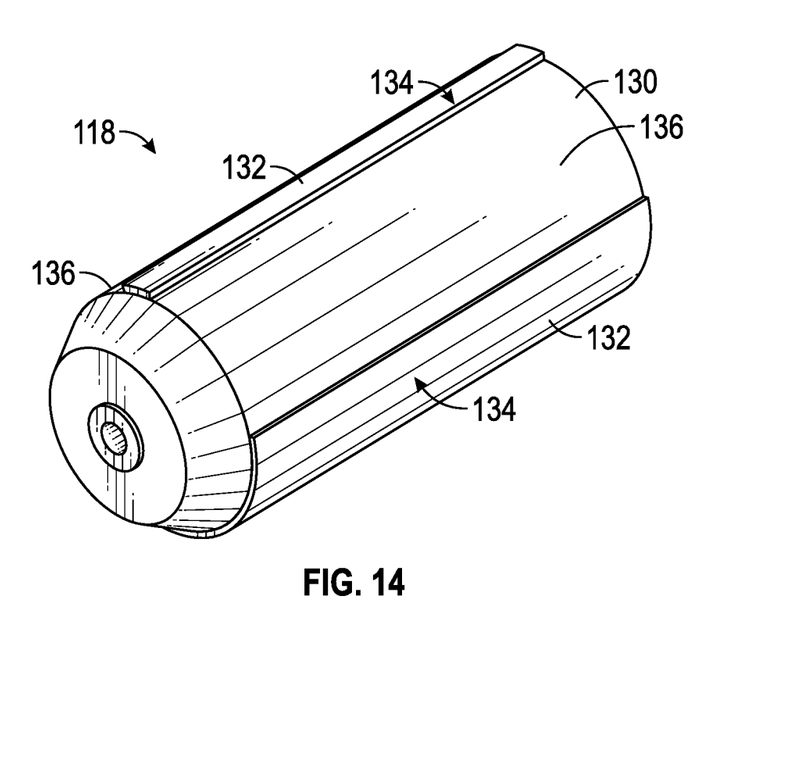
FIG. 14 is a top perspective view of another embodiment of a roller for use with shrink sleeve apparatus of claim 1.
Figure 15:
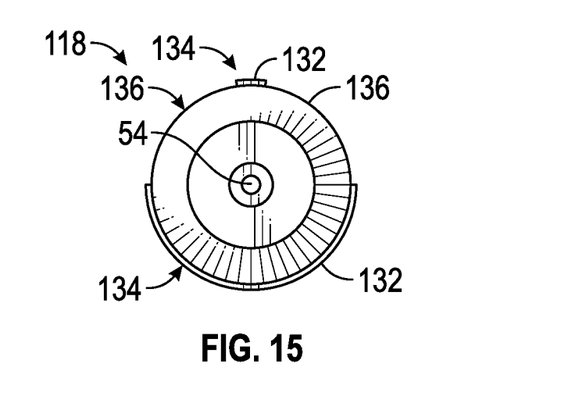
FIG. 15 is a front end view of the roller of FIG. 14.

As shown in FIGS. 14 and 15, in another embodiment, roller 118 can be a solid cylindrical roller having a cylindrical outermost surface 130. Rather than having channels 48 and traction rings 50 disposed in the channels 48 as shown in FIGS. 2-13, the outermost surface 130 of the roller 118 can have a surface treatment 132 applied in one or more traction regions 134 of the outermost surface 130 to increase the coefficient of friction in the traction regions 134 of the outermost surface 130. The traction regions 134 correspond to the high traction segments 47 of roller 118. The thicknesses of the surface treatments 132 are exaggerated in FIGS. 14 and 15 for the purposes of illustration. In one embodiment, the surface treatment 132 can include a friction coating applied to the traction regions 134 of the outermost surface 130. In one embodiment, the surface treatment 132 can include laminating a material having a higher coefficient of friction, such as rubber film, to the outermost surface 130 of the roller 118 using an adhesive or other bonding agent. The outermost surface 130 of the roller 118 has one or more untreated regions 136 in which the surface treatment 132 is not applied. The untreated regions 136 correspond to the low traction segments 49 of roller 118 and can alternate with the traction regions 134. The relative positions of the high traction segments 47 and low traction segments 49 can be similar to the relative positions of the high and low traction segments 47, 49 described in previous embodiments of roller 18 having traction rings 50 received in channels 48 in the outermost surface (FIGS. 2-10). Roller 118 can also include the flat alignment surface 60 and central bore 54 as described in reference to previous embodiments described in relation to FIGS. 2-6.

The roller 118 in the embodiment described in conjunction with FIGS. 14-15 operates in a manner similar to the roller 18. Upstream of the shrink sleeve applicator 14 (FIG. 1), the alignment apparatus aligns and locks the rollers 118 in a position having the untreated regions 136 oriented towards the v-shaped pockets 24 (FIG. 2) defined between rollers 118. With the rollers 118 in this position, the article is in contact with and supported by circumferential contact with the untreated regions 136 of the outermost surface 130 of each roller 118. In this position, the shrink sleeve applicator 14 can push the shrink sleeve horizontally over the article without catching and binding on the surface treatment 132 applied in the traction regions 134, which are rotated away from the v-shaped pockets 24 (FIG. 2). Once the shrink sleeve is pushed onto the article, the rollers 118 are released from the locked position and allowed to freely rotate. In the heating section 16 (FIG. 1), the contacting surface 26 (FIG. 10) contacts the outermost surface 130 of the roller 118, which causes the roller 118 to slowly rotate. Rotation of the roller 118 causes the traction regions 134 to rotate into contact with the shrink sleeve around the article. The surface treatment 132 of the traction regions 134, through increased friction, grip the shrink sleeve and rotate the shrink sleeve and article therein within the v-shaped pockets 24 (FIG. 2). Thus, the traction regions 134 facilitate rotation of the shrink sleeved article within the heating section 16.

The shrink sleeve apparatus 10 can be used in a method for applying a shrink sleeve to an article. The method of applying a shrink sleeve includes utilizing the conveyor 12 that includes side-by-side first and second rollers. The method will be described using rollers 18, however, it is understood that the method could be practiced with first and second rollers that are rollers 18 (FIGS. 3-9) or rollers 118 (FIGS. 14-15). Each of the first and second rollers 18 include a circumscribing outer portion with at least one high traction segment 47 and at least one low traction segment 49. The circumscribing outer portion of rollers 18, 118 may include one or more portions of the outermost surface 30 of the rollers 18, 118 (FIG. 9), one or more portions of the outer surface 74 of traction rings 50 received in channels 48 of the rollers 18 (FIG. 9), or one or more traction regions 134 of roller 118 having a surface treatment 132 applied thereto (FIGS. 14-15).

The method also includes conveying an article on the conveyor 12. The article is supported laterally on the conveyor 12 between the first and second rollers 18 and in contact with part of the circumscribing portions of each of the first and second rollers 18. The method includes positioning the first and second rollers 18 such that the article is in contact with the low traction segment 49 of each of the first and second rollers 18 as the article moves past the shrink sleeve application station 14 (shrink sleeve applicator). The shrink sleeve application station 14 applies a shrink sleeve over the article by pushing the sleeve horizontally over the article. The first and second rollers 18 are rotationally positioned so that the high traction segments 47 of the rollers 18 are positioned away from the article so that the sleeves do not catch or bind on the high traction segments 47 as the shrink sleeve applicator 14 pushes the shrink sleeve over the article. By rotationally positioning the rollers 18, the high traction segments 47 do not interfere with application of the sleeve.

The conveyor 12 moves the article and the applied sleeve to and through the heat shrink station 16 (zone) which is positioned downstream of the shrink sleeve applicator 14. In the heat shrink station 16, the rollers 18 are rotated, which brings the high traction segments 47 of the rollers 18 into contact with the article and the applied sleeve. Bringing the high traction segments 47 of the rollers 18 into contact with the article and the applied sleeve assures rotation of the article and applied sleeve during the heat shrink of the applied sleeve.

The shrink sleeve apparatus 10 described herein having horizontal conveyor 12 with rollers 18, 118 can be capable of rotating small diameter articles of right circular cylindrical shape or other non-round cylindrical shapes or even other irregular-shaped articles in the heating section 16 of the shrink sleeve apparatus 10. This rotation by the rollers 18, 118 can allow the heating section 16 to provide even heating to the shrink sleeve, which can ensure that the shrink sleeve is evenly shrunk over the article and properly sealed. Further, the ability of the shrink sleeve apparatus 10 to rotationally position the rollers 18, 118 in the conveyor 12 so that the article is supported by the outermost surface 30, 130 of the rollers in the low traction segments 49 of the roller 18, 118 can allow for the shrink sleeve applicator 14 to push the shrink sleeves over the articles without the shrink sleeves catching on the high traction segments 47 (e.g., the outer surface 74 of the traction rings 50 received in the traction portions 70 of roller 18 or traction regions 134 of roller 118) of the rollers 18, 118. Preventing the shrink sleeves from catching on the high traction segments 47 of the rollers 18, 118 may reduce periodic stoppage of the shrink sleeve apparatus 10, which may reduce downtime of the shrink sleeve apparatus 10.

It is to be clearly understood that the above description is intended by way of illustration and example only, is not intended to be taken by way of limitation, and that other changes and modifications are possible.

What is claimed is:

1. An apparatus comprising:
   a shrink sleeve application station;
   a heat shrink station disposed downstream of the shrink sleeve application station; and
   a horizontal conveyor having side-by-side first and second rollers, the conveyor being positioned so that the first and second rollers travel past the shrink sleeve application station and then past the heat shrink station;
   wherein each of the first roller and the second roller is formed, respectively, by:
      a roller body with a circumscribing channel formed in an outer surface of the roller body and a traction ring disposed within the circumscribing channel, wherein the circumscribing channel includes a first portion and a second portion, the first portion having a depth that cooperates with a first segment of the traction ring such that part of the first segment protrudes outwardly beyond the outer surface of the roller body to at least in part define a high traction segment of the roller, the second portion having a depth that cooperates with a second segment of the traction ring such that an entirety of the second segment is recessed below the outer surface of the roller body to at least in part define a low traction segment of the roller; and
   wherein as the conveyor passes by the shrink sleeve application station, the first and second rollers are maintained in respective set rotational positions in which the low traction segment of each of the first and second rollers is oriented towards a pocket defined between the first and second rollers.

2. The apparatus of claim 1 wherein the conveyor further comprises a contacting surface positioned at the heat shrink station to contact the roller body of each of the first and second rollers, the contact causing the first and second rollers to rotate.

3. The apparatus of claim 1 wherein the conveyor further comprises an alignment station having an aligning surface in contact with an end portion of each roller body as the roller body moves over the aligning surface, the contact causing the first and second rollers to rotate.

4. The apparatus of claim 3 wherein the end portion of each of the first and second rollers includes a flat alignment surface, wherein an orientation of the flat alignment surface facing toward the aligning surface of the alignment station eliminates contact between the end portion and the aligning surface to establish the set rotational position.

5. The apparatus of claim 4 wherein the alignment station comprises one or more bar magnets and the flat alignment surface of each roller body includes a magnetic material that is attracted by the one or more bar magnets to maintain the set rotational position.

6. The apparatus of claim 1 wherein, when the first and second rollers are in the set rotational positions, each high traction segment is positioned so as to not interfere with a shrink sleeve applied by the shrink sleeve application station.

7. A roller comprising:
   an elongated roller body defining an axis of rotation;
   a channel formed in an outer surface of the roller body, the channel circumscribing the roller body and the axis of rotation;
   a traction ring disposed within the channel;

wherein the channel includes a first portion and a second portion, the first portion having a depth that cooperates with a first segment of the traction ring such that part of the first segment protrudes outwardly beyond the outer surface of the roller body to at least in part define a high traction segment of the roller, the second portion having a depth that cooperates with a second segment of the traction ring such that an entirety of the second segment is recessed below the outer surface of the roller body to at least in part define a low traction segment of the roller; and wherein the channel includes a third portion and a fourth portion, the third portion having a depth that cooperates with a third segment of the traction ring such that part of the third segment protrudes outwardly beyond the outer surface of the roller body to at least in part define an additional high traction segment of the roller, the fourth portion having a depth that cooperates with a fourth segment of the traction ring such that an entirety of the fourth segment is recessed below the outer surface of the roller body to at least in part define an additional low traction segment of the roller, wherein a first end of the additional low traction segment is circumferentially spaced from the low traction segment by the high traction segment and a second end of the additional low traction segment is circumferentially spaced from the low traction segment by the additional high traction segment.

8. The roller of claim 7 wherein an end portion of the roller body includes a flat facing outward from the axis of rotation, the flat including a magnetic member disposed therein.

9. A method of applying a shrink sleeve to an article, the method comprising:
utilizing a conveyor including first and second rollers spaced from each other to provide an article receiving pocket, wherein the first roller includes a first circumscribing outer portion with a high traction peripheral segment and a low traction peripheral segment, wherein the second roller includes a second circumscribing outer portion with a high traction peripheral segment and a low traction peripheral segment;
conveying the article within the article receiving pocket as the first and second rollers move along a conveyance path, where the article supported in a lateral orientation in the article receiving pocket and in contact with both part of the first circumscribing outer portion and part of the second circumscribing outer portion;
controlling rotation of the first roller to achieve a set rotational position and the second roller to achieve a set rotational position such that, as the shrink sleeve is moved laterally onto the article, the article is both (i) in contact with both the low traction peripheral segment of the first roller and the low traction peripheral segment of the second roller and (ii) not in contact with either the high traction peripheral segment of the first roller or the high traction peripheral segment of the second roller, so that the high traction segment of the first roller and the high traction segment of the second roller do not interfere with sleeve application; and
as the conveyor moves the article and applied sleeve through a downstream heat shrink zone, rotating the first and second rollers such that the high traction segment of the first roller and the high traction segment of the second roller contact and rotate the article with applied sleeve during heat shrink of the applied sleeve.

10. The method of claim 9 wherein the high traction segment of the first roller is defined by a traction layer or coating applied to an outer surface portion of the first roller and the high traction segment of the second roller is defined by a traction layer or coating applied to an outer surface portion of the second roller.

11. The method of claim 9 wherein:
the first roller is formed by a first roller body with a first circumscribing channel formed in an outer surface of the first roller body and a first traction ring disposed within the first circumscribing channel, wherein the first circumscribing channel includes a first portion and a second portion, the first portion having a depth that cooperates with a first segment of the first traction ring such that part of the first segment protrudes outwardly beyond the outer surface of the first roller body to at least in part define the high traction peripheral segment of the first roller, the second portion having a depth that cooperates with a second segment of the first traction ring such that an entirety of the second segment is recessed below the outer surface of the first roller body to at least in part define the low traction segment of the first roller;
the second roller is formed by a second roller body with a second circumscribing channel formed in an outer surface of the second roller body and a second traction ring disposed within the second circumscribing channel, wherein the second circumscribing channel includes a first portion and a second portion, the first portion of the second circumscribing channel having a depth that cooperates with a first segment of the second traction ring such that part of the first segment of the second traction ring protrudes outwardly beyond the outer surface of the second roller body to at least in part define the high traction peripheral segment of the second roller, the second portion of the second circumscribing channel having a depth that cooperates with a second segment of the second traction ring such that an entirety of the second segment of the second traction ring is recessed below the outer surface of the second roller body to at least in part define the low traction segment of the second roller.

12. The method of claim 9 wherein the step of controlling rotation of the first roller to achieve a set rotational position and the second roller to achieve a set rotational position involves aligning a magnetic material insert of the first roller with an elongated bar magnet of an alignment station such that the magnetic material insert is attracted to the elongated bar magnet to maintain the set rotational position of the first roller and aligning a magnetic material insert of the second roller with the elongated bar magnet such that the magnetic material insert of the second roller is attracted to the elongated bar magnet to maintain the set rotational position of the second roller.

13. The method of claim 9 wherein the step of controlling rotation of the first roller to achieve a set rotational position and the second roller to achieve a set rotational position involves closely positioning a flat on the first roller with a flat surface so that rotation of the first roller cannot occur as the first roller moves past the flat surface and closely positioning a flat on the second roller with the flat surface so that rotation of the second roller cannot occur as the second roller moves past the flat surface.

* * * * *